(12) United States Patent
Katikala

(10) Patent No.: US 10,691,834 B2
(45) Date of Patent: Jun. 23, 2020

(54) SYSTEM AND METHOD OF A PRIVACY-PRESERVING SEMI-DISTRIBUTED LEDGER

(71) Applicant: RenterPeace LLC, Washington, DC (US)

(72) Inventor: Chaitanya Katikala, Washington, DC (US)

( * ) Notice: Subject to any disclaimer, the term of this patent is extended or adjusted under 35 U.S.C. 154(b) by 176 days.

(21) Appl. No.: 16/044,173

(22) Filed: Jul. 24, 2018

(65) Prior Publication Data

US 2019/0034663 A1 Jan. 31, 2019

Related U.S. Application Data

(60) Provisional application No. 62/536,789, filed on Jul. 25, 2017.

(51) Int. Cl.
| | |
|---|---|
| *G06F 21/64* | (2013.01) |
| *H04L 9/06* | (2006.01) |
| *H04L 9/32* | (2006.01) |

(52) U.S. Cl.
CPC .......... *G06F 21/64* (2013.01); *H04L 9/0643* (2013.01); *H04L 9/3239* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 10,169,937 B1* | 1/2019 | Zwink | G06F 21/31 |
| 10,320,569 B1* | 6/2019 | Wentz | H04L 9/0866 |
| 2016/0098723 A1* | 4/2016 | Feeney | G06Q 20/4016 705/75 |
| 2016/0162897 A1* | 6/2016 | Feeney | G06Q 20/065 705/71 |
| 2017/0075941 A1* | 3/2017 | Finlow-Bates | H04L 67/104 |
| 2018/0254841 A1* | 9/2018 | Nannra | H04L 69/28 |
| 2018/0343120 A1* | 11/2018 | Andrade | H04L 9/3231 |

* cited by examiner

*Primary Examiner* — Kaveh Abrishamkar

(57) ABSTRACT

A system and method of preserving the integrity and privacy of user data in a semi-distributed ledger by saving validation files to user computers and comparing the validation files to the ledger data.

23 Claims, 10 Drawing Sheets

SYSTEM AND METHOD OF A PRIVACY-PRESERVING SEMI-DISTRIBUTED LEDGER

PRIORITY

This application claims priority to U.S. Provisional Application Ser. No. 62/536,789, filed Jul. 25, 2017. The above referenced application is incorporated herein by reference as if restated in full.

BACKGROUND

Transaction ledgers are currently implemented in a distributed (e.g., the BitCoin blockchain) or centralized manner (e.g., traditional SQL databases). These ledgers are used to store financial records, data, and media.

In certain applications, users want guarantees that database records haven't been modified, deleted, or tampered with. While a centralized ledger requires faith in the operator to affirm that a ledger has not been tampered with, a distributed ledger offers independently verifiable guarantees about the immutability of the ledgers. This is guaranteed because many parties have a copy of the entire blockchain. The downside is that a fully distributed ledger reveals a lot of data about the overall ledger and other peoples' transactions, such as how many transactions have taken place and the number of transactions per user. A fully distributed ledger also has high computational and storage requirements for its participants, making it unsuitable for many real-time web or app-based applications. Storage of more than a few rows of a ledger in browser cookies, for example, would cause a severe slowdown in the operation of a website. Finally, without central management, pushing patches and maintaining the distributed ledger requires votes from the participants, which can sometimes be slow-moving, political, and is vulnerable to manipulation by a 51% attack.

When documenting legally important transactions between parties through software, users may seek the assurances of distributed database without those downsides. More specifically, parties in a dispute or their mediator (a judge, arbitrator, etc.) may find centralized databases to offer an insufficiently validated record as evidence. In traditional centralized ledgers, a missing or deleted record from most centralized databases would be undetectable by users. A fully distributed database may not be possible as an alternative for certain applications, such as browser-based applications, due to the data transfer and storage overhead and certain privacy issues. The challenge is providing lightweight independent database verification without sacrificing control, transparency, or user privacy. For this reason, a third option is required: an efficient semi-distributed ledger that offers users proof that a centrally-held database has not been tampered with. This provides the benefits of a traditional database without the above-mentioned downsides of a distributed database.

SUMMARY

The system uses a privacy-friend semi-distributed ledger to provide accountability of the immutability of a centralized database, designed for minimal overhead. Signatures for certain user records from the centralized database are stored locally on the user's device or browser's local storage, typically in a cookie. These signatures are verified by database operator and the system produces errors if a system operator modifies the database. The functionality underlying these errors can be independently verified by technically savvy users. In other words, if the operator fails to show the user an error when a record has been tampered with, it is detectable by users.

This system achieves nearly the same privacy protections as a traditional database. It allows permissioned access: users only have the ability to view their own records and transactions. Users will also not be able to see metadata about the distributed ledger, such as the total number of records, the total number of user ids, or how many transactions each user id is associated with.

This system is fast and lightweight. Only a few records' signatures are required to be stored on a user's computer at a time. These signatures are small enough to be stored as browser cookies and contain protections against client-side tampering of other people's records. To test the database operator, users are permitted to tamper with their own signatures, which will show the user an error.

The system creates incentives for software operators to disclose any database changes accurately. Validation of the client-side signatures occur when the user visits the application or website. Because the software operator does not know which user or signature will need validation next or when the validation will occur, there's a high risk that any modification of a record, even temporarily, will be exposed to users.

DETAILED DESCRIPTION

Figure 1:
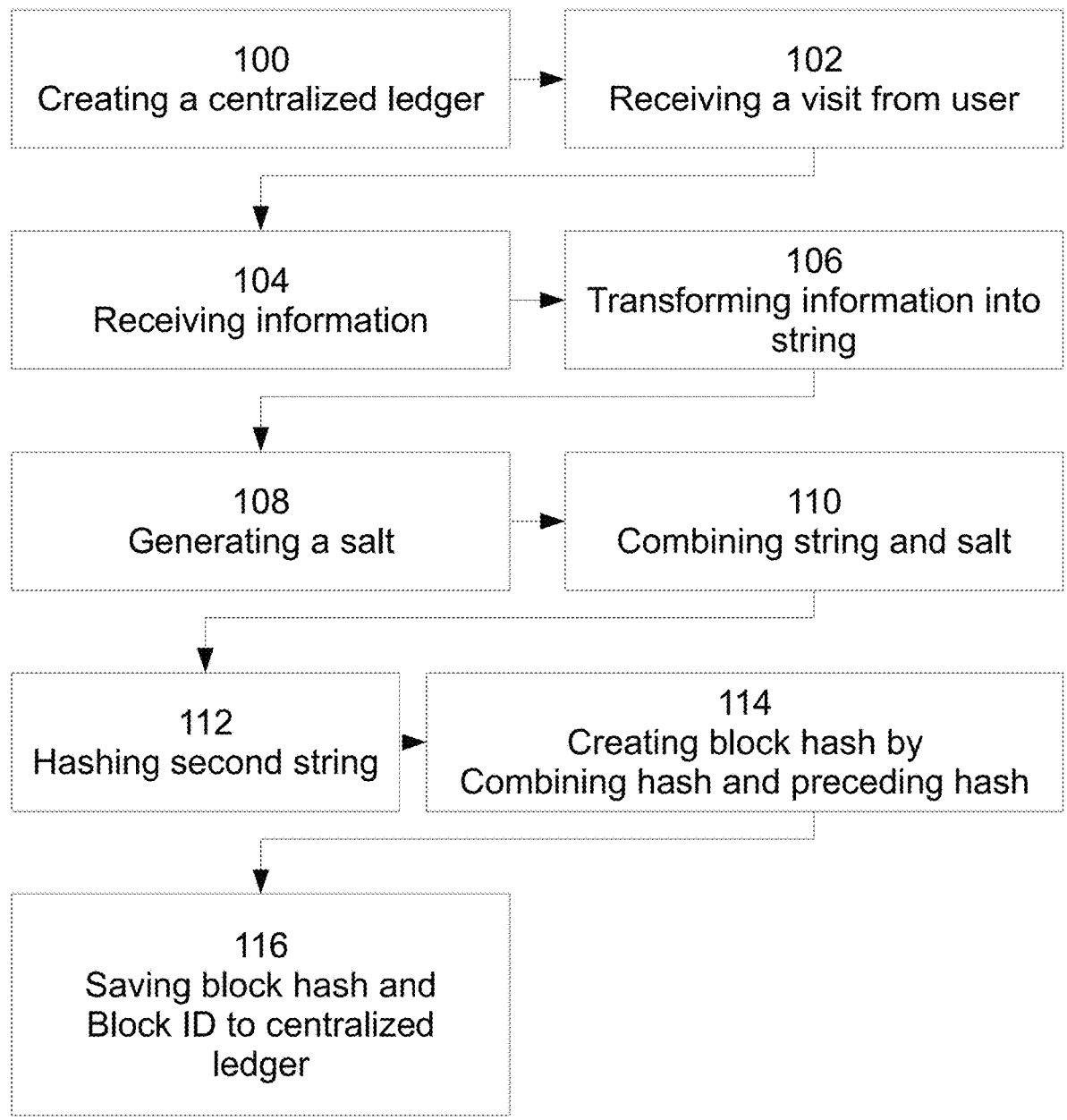
FIG. 1 is a flowchart showing an exemplary method of creating a block hash.

The system requires the database operator to implement two key components—1) a server-side centralized linked ledger with certain properties, and 2) a client-side system to store and validate portions a user's own blocks of the ledger.

The first part of the system implements a linked ledger, like that found in blockchains. The ledger stores a one-way cryptographic hash of a user's records, which may include any variation of binary data. In most implementations, the binary data is or will be converted to a string prior to hashing. The centralized data must have the following properties:

It's crucial that the system does not create separate ledgers for each users, but instead creates a single linked ledger for all users.

The software interface must allow users to view the specific data that was used generated to hash, (i.e., their "blocks") such that the user would be able to generate the hash themselves.

The hash of each record must include the hash of the previous record in the chain as well to create the "linked" effect of the ledger.

Each record also requires storage of its own randomly generated salt, which must remain immutable and is not part of the data included to generate the hash. The user must be able to view the salt for their own records. Typically, this might appear on the page where the user sees how the hash was generated.

The second part of the system stores portions of the user's own blocks locally on their computers or devices, typically using browser cookies or similar types of local storage. This allows users to view and validate records, and to independently verify that records haven't been changed with extremely low overhead.

The hash signature must be stored locally on the user's computer or device. For security, the software should store the block id and a new hash of a string generated by concatenating the block's salt along with the block's hash (the "user-side code"). To prevent reverse engineering a salt used across the website or application, the operator should disable site-wide or application-wide encryption when storing of the locally stored records, and instead rely exclusively on the record-specific salt stored within the validated data.

If storing a signature containing data that the user is not permitted to view, then an additional step is required: signing and encrypting the signature using a user-specific salt. This prevents the user from tampering with the signature to show a false error to the users who have permission to view the data.

When the user visits the software (a website or app) implementing this ledger system, it validates the records and display an error in the user interface to the user if the records stored on their computer don't match the database records. Validation occurs by looking up the record by the id stored locally on the user's computer. Then, the system generates a new hash based on the block's salt along with the block's hash to generate a new user-side code. If the new user-side code matches the one stored on the user's computer or browser, then the validation passes and no error is thrown. Otherwise, the system displays an error to the user.

Instead of storing the complete collection of the blocks associated with the user, the system may simply store a few records at a time on the user's local storage provided the operator doesn't store information about which records were stored. Certain implementations will randomly (or otherwise) select a small number of records for each user to store locally on their computer. Certain implementations will replace records chosen for a user to store locally after the software verifies the records.

The software operator will not know when users will visit next and thus, the when validations will occur. Where only a few records are stored locally on the user's computer, the software operator will not know which records are stored and therefore, the operator will not know which records will be validated next. By modifying the values of their locally stored identifiers, diligent users can test that the operator is not producing false positives or false negatives. If the operator fails to throw an error when a user intentionally tampers with the signature, then it's apparent the operator is not correctly displaying errors to the end users.

Because the records are linked, modifying one record will cause at least two records to fail to validate, sometimes held by different users. Because of the nature of the linked ledger, any user that publicly demonstrates that their ledger has been tampered will, by implication, demonstrate that any following records may also be invalid, providing accountability over the centralized ledger holder in their claims that they did not tamper or delete any records.

The system platform may be accessible to user computers over a network. The platform may include one or more websites which users can access via their browsers. During website visits, users may communicate to the platform one or more articles of information, including account or transactional information. Examples of account information include credit card or bank data, user identity entries, as well as user names and passwords. Examples of transactional information include purchase, sales, or other monetary conveyance data. Examples of transactional information may also include non-financial information, such as documents, media, or other data. Records of this account and transactional information, or any other kind of information that is preferably secure and as well as private, may be stored in a ledger associated with the system platform.

The ledger is ideally centralized, being stored on and updated and accessed from a database preferably saved on a server that may or may not be accessed by the primary operator(s) of some instantiation of the system platform. To prevent an operator from corrupting the centralized ledger, the blockchain that constitutes the ledger may, in whole or in part, be distributed componentially across user computers. Particularly, individual blocks or aspects thereof may be transmitted to the user computers via the browser mediums or related software in the form of code files such as cookies. A cookie may be created or loaded with block chain information by entering a block ID in a cookie name field and a block hash in a cookie value field. These cookies, after being saved to local computers, may be transmitted back to the server or system platform upon a return visit or access attempt, whereupon they may be compared with the blocks on the centralized ledger and/or with the cookies of other visiting users. Unmatching cookies may result in error messages, which may be discoverable on the platform's websites themselves or transmitted to one or more users of the platform, including, in one variation, the users whose information was used to create the blocks connected with the unmatching cookies, in another variation, users unconnected with that information, and in another variation, the user(s) whose cookies were used in the comparison that led to the error.

In the event of a matching error, the system platform may determine whether the corruption of the block data is attributable to the operator or the user of the system platform, principally by testing other cookies responsible for validating the same block but saved to other user computers.

In one embodiment, in response to a matching error in which blame is attributed to an operator of the system platform or in an interrum before error attribution can be determined, the system platform may shut down in whole or in part the functionality of the website(s) or access by those responsible for maintaining or otherwise accessing the centralized ledger. In another embodiment, a message is communicated to a third party capable of addressing the corruption of the blockchain through legal or administrative measures.

In one embodiment, hashed signatures are signed and encrypted prior to being saved as cookie data. Each user is given a different salt that is used to encrypt or can be used to decrypt their own information or derivatives thereof. In another embodiment, users only receive cookies that loaded or created with block data relating to their own account or transactional information.

The block data loaded onto a cookie for a given user can be randomly selected, not previously loaded onto a cookie, not yet loaded onto a cookie a given number of times, not yet validated, or not yet validated a given number of times. The block data may be selected for a given user because it is built on the given user's account or transactional information or because it is not built on the given user's data.

Account or transactional information may be combined with one or more strings and/or encrypted one or more times. Strings set for combination may be randomly generated, the result of previous hashes, blank, contain descriptions of prior strings, such as ownership, origin, or the fact of encryption, and/or derived from other sets of account or transactional information.

FIG. 1 is a flowchart showing an exemplary method of creating a block hash. Steps include creating a centralized ledger 100, receiving a visit from a user 102, receiving transactional or account information from the user 104, transforming the information into a string 106, generating a salt 108, creating a second string by combining the first string and the salt 110, hashing the second string 112, creating a block hash by combining a preceding block hash and the initial hash 114, saving the block hash and a block ID to the centralized ledger 116.

Figure 2:
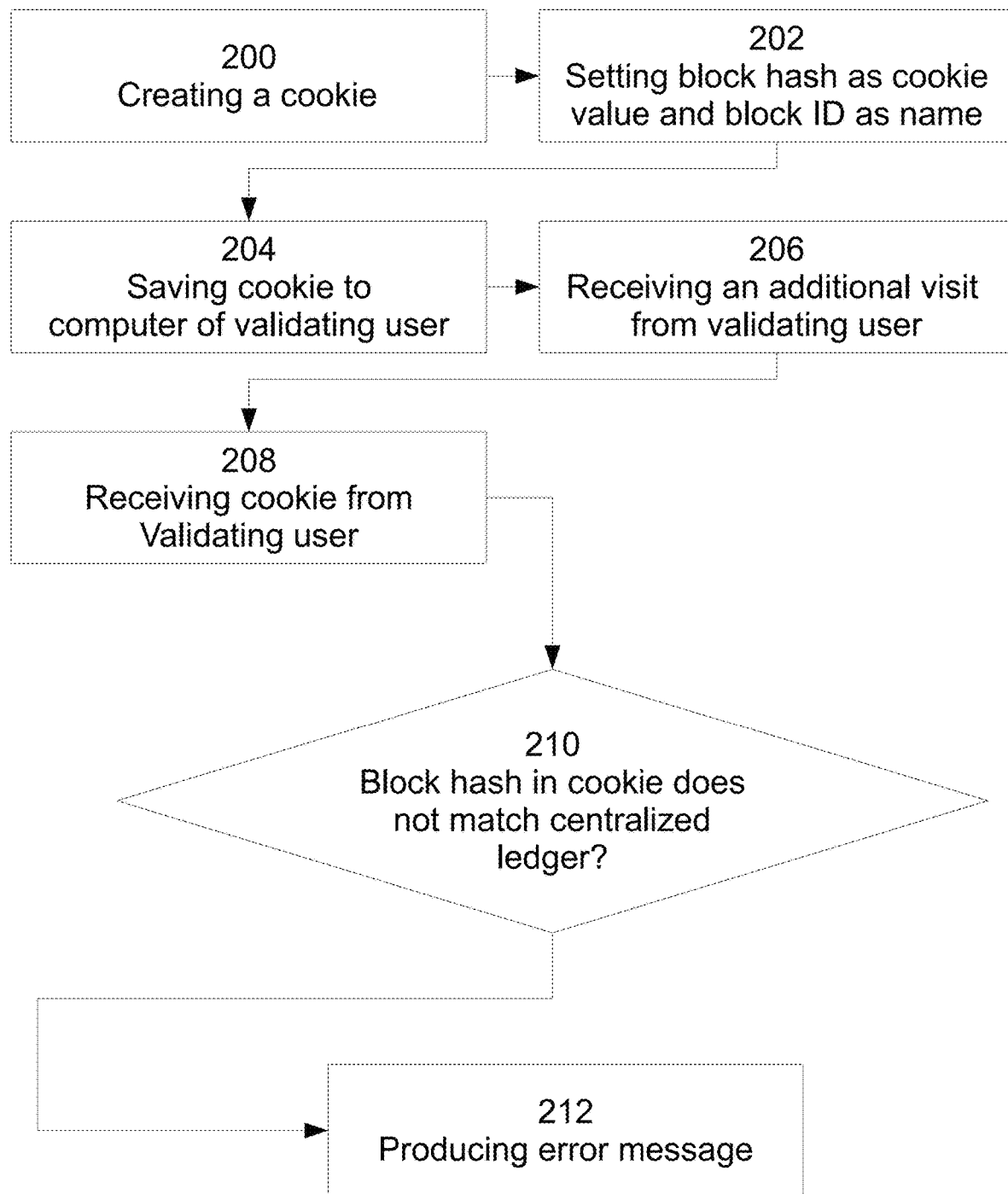
FIG. 2 is a flowchart showing an exemplary method of validating the centralized ledger.

FIG. 2 is a flowchart showing an exemplary method of validating the centralized ledger. Steps include creating a cookie 200, setting the block hash as the cookie value and the block ID as the cookie name 202, saving the cookie to a computer of a validating user 204, receiving an additional visit from the validating user 206, receiving the cookie from the validating user's computer 208, and if the block hash in the cookie does not match the block hash in the centralized ledger 210, producing an error message 212.

Figure 3:
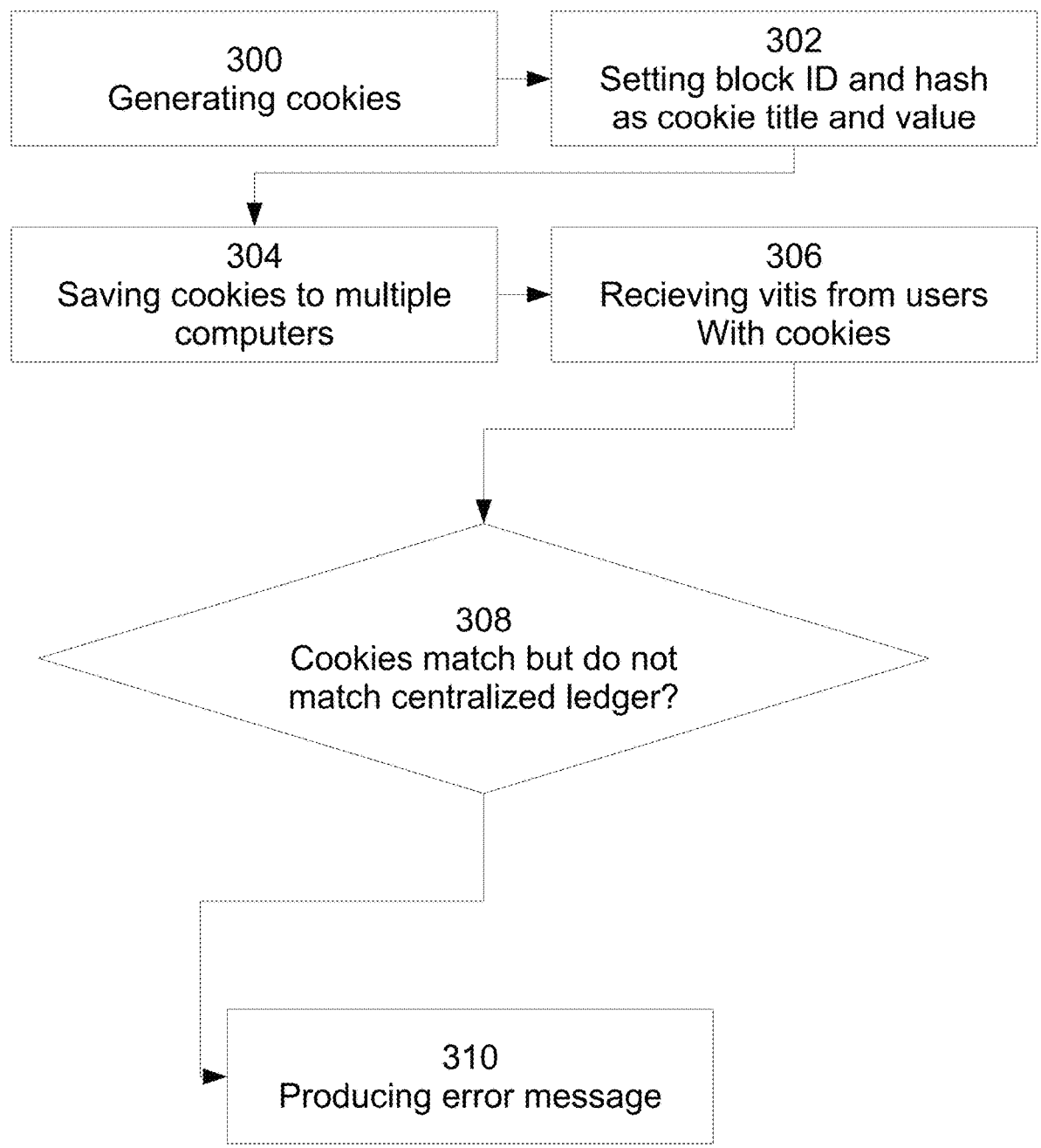
FIG. 3 is a flowchart showing an exemplary method of validating the centralized ledger.

FIG. 3 is a flowchart showing an exemplary method of validating the centralized ledger. Steps include generating cookies 300, setting a block ID and a corresponding block hash as the cookie title and value, respectively 302, saving the cookies to multiple user computers 304, receiving later visits from the users with the cookies 306, and if the cookies on the user computers match but the block hash from the cookies does not match the block hash from the centralized ledger 308, producing an error message 310.

Figure 4:
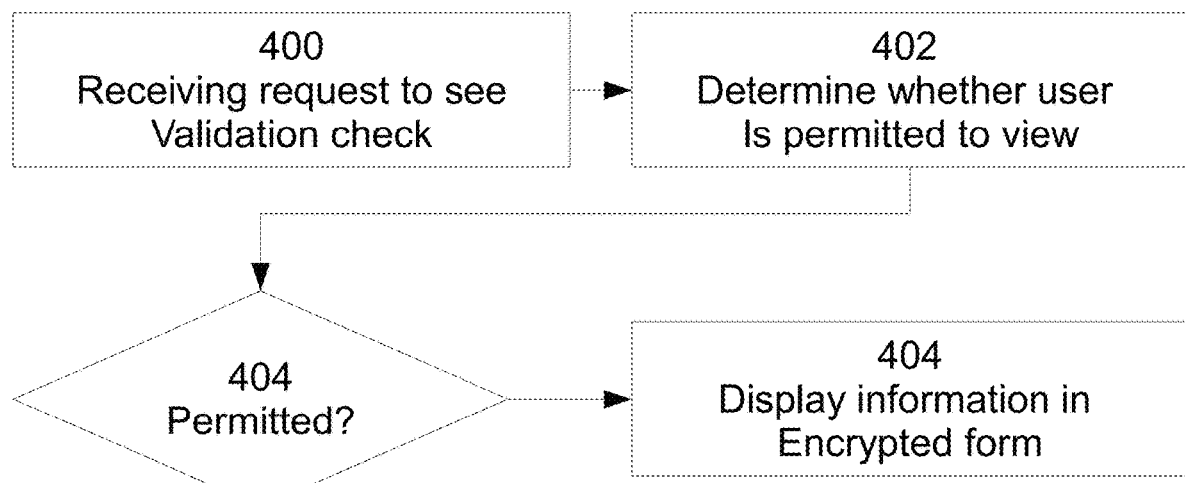
FIG. 4 is a flowchart showing an exemplary method of permitting independent validation of the centralized ledger.
Figure 5:
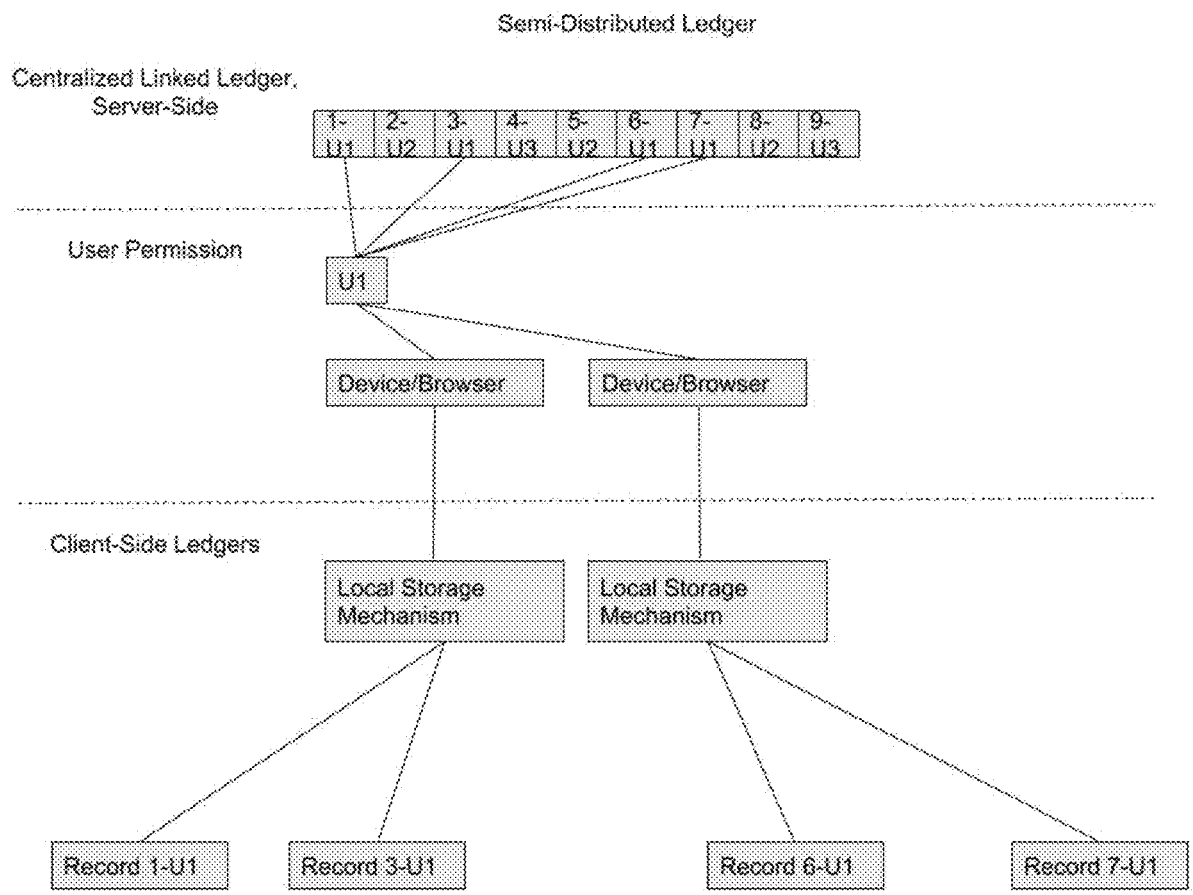
FIG. 5 shows an exemplary diagram of a semi-distributed ledger system.
Figure 6:
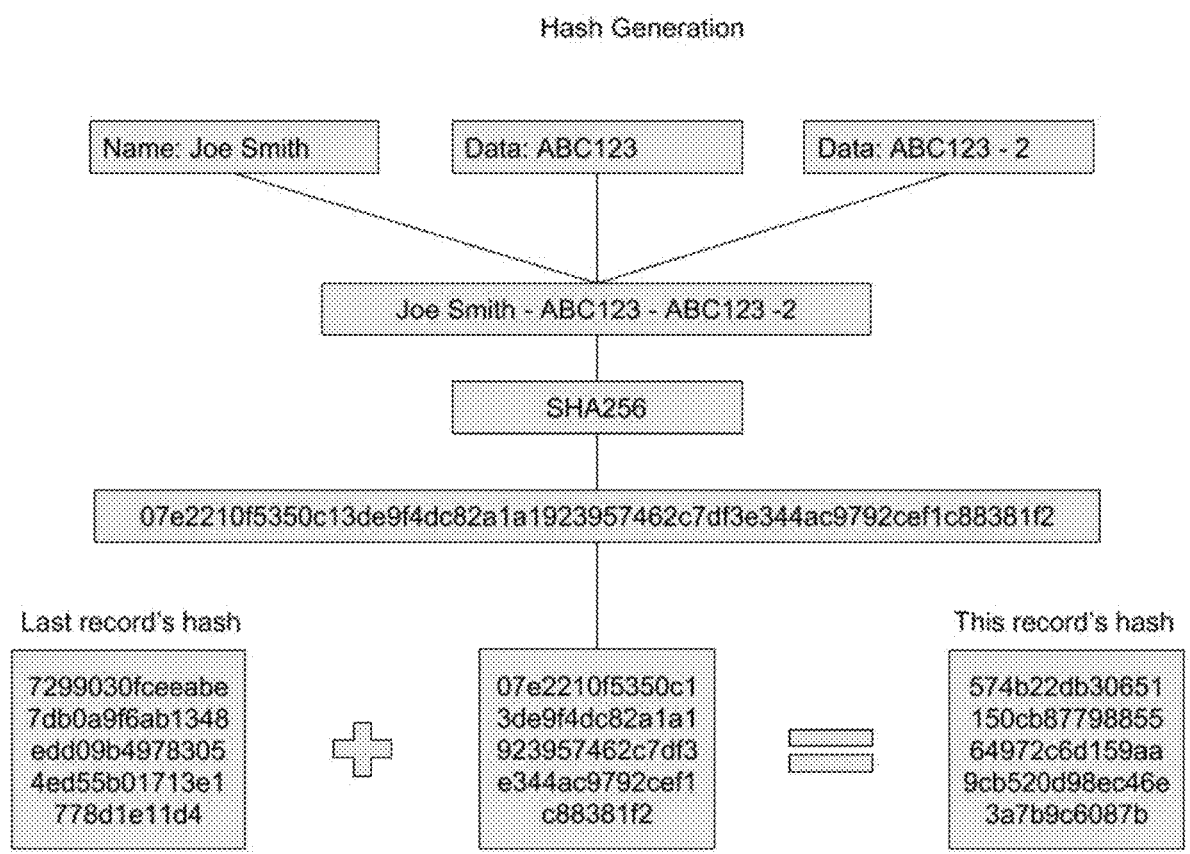
FIG. 6 shows an exemplary diagram of mandatory properties of the centralized database.
Figure 7:
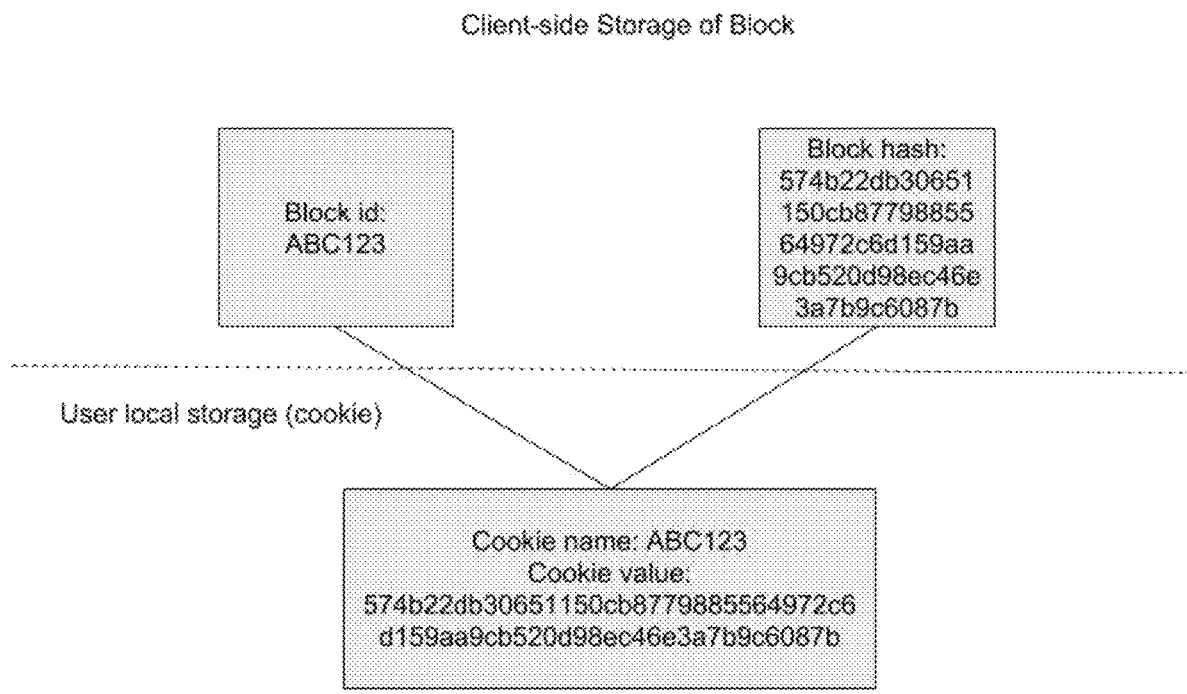
FIG. 7 shows an exemplary diagram of mandatory properties of the user's locally stored records, as cookies.
Figure 8:
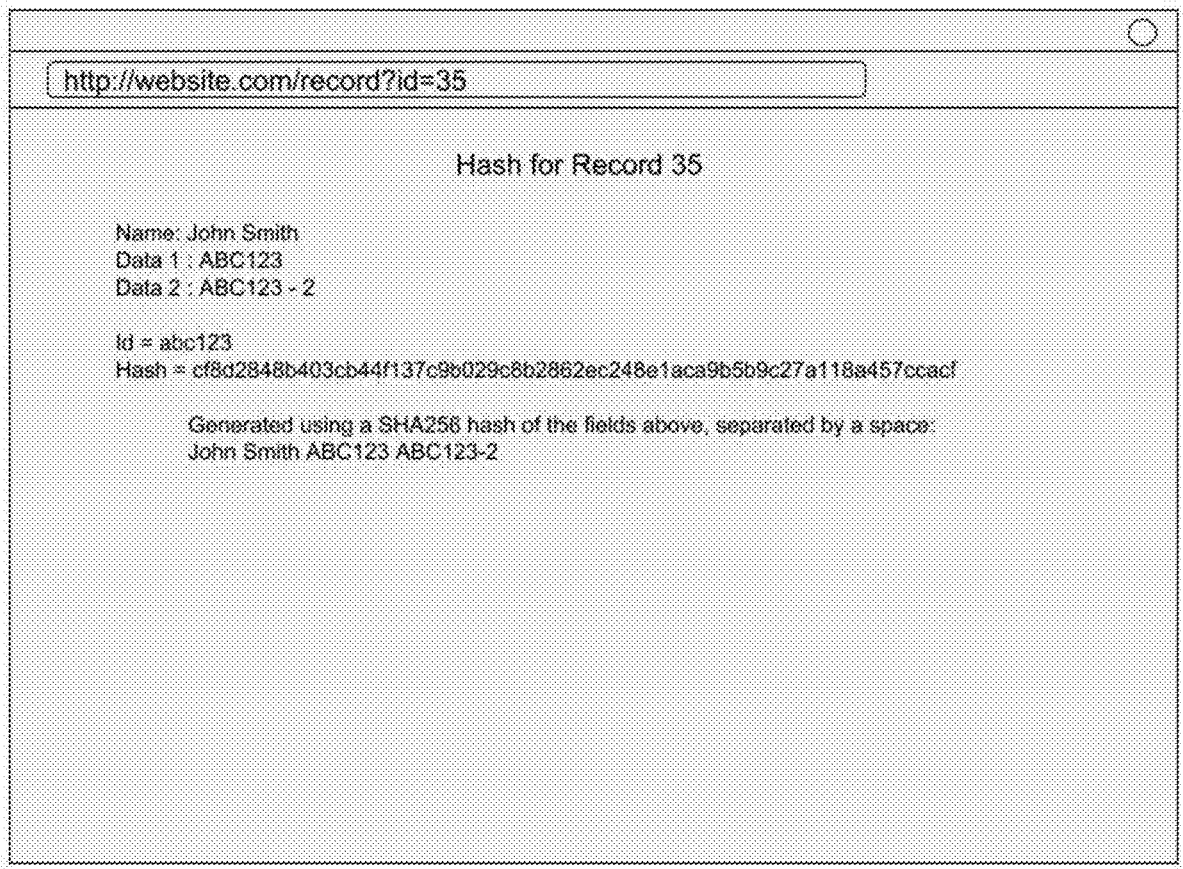
FIG. 8 shows an exemplary user interface displaying to the user how the ledger record was generated.
Figure 9:
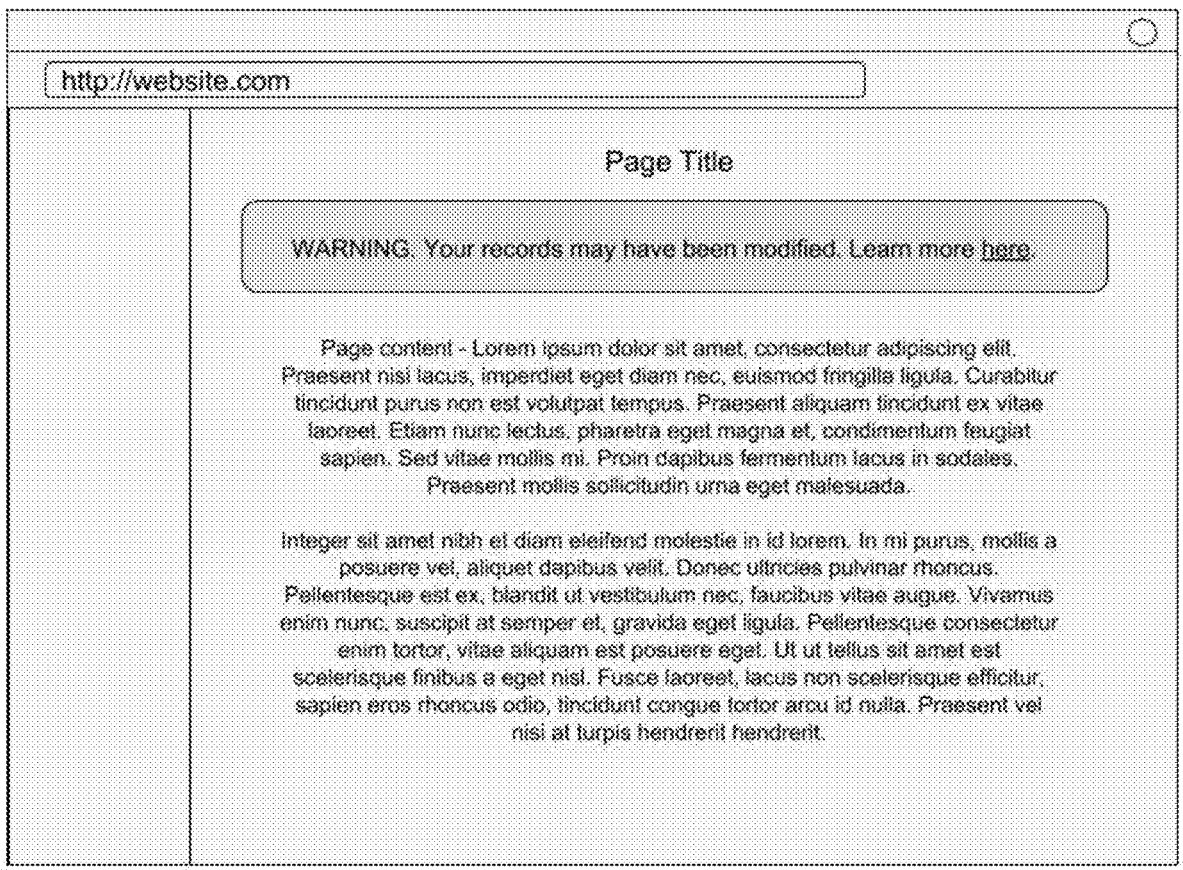
FIG. 9 shows an exemplary user interface displaying an error to a user that their records may have been modified.
Figure 10:
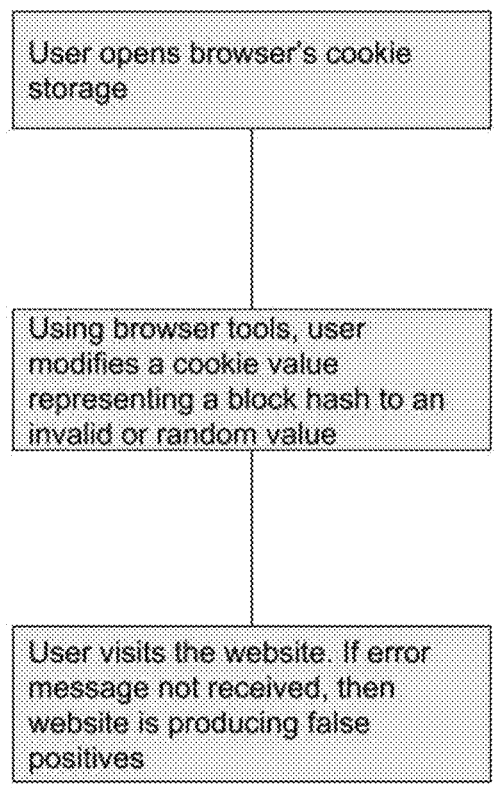
FIG. 10 shows an exemplary flowchart of how a user can check for false positives.

FIG. 4 is a flowchart showing an exemplary method of permitting independent validation of block hashes. Steps include receiving a request from a user to see a validation check or check information 400, determining whether the user is permitted to view the account or transactional information 402, and if not permitted 404, displaying in an encrypted form the transactional or account information, the salt, the block hash, and the preceding block hash 406.

The invention claimed is:

1. A method of preserving the integrity and privacy of user data including the steps of:
creating a centralized ledger, storing data saved to the centralized ledger data to a database, receiving updates to the centralized ledger from a user interface platform accessible over a network;
receiving a first visit from a first user using a first computer, a first visit from a second user using a second computer, and a first visit from a third user using a third computer;
receiving transactional or account information from the first user, creating a set of user data using the transactional or account information received from the first user, transforming the set of user data into a first string, determining a preliminary ID for the set of user data, and storing the preliminary ID in the database;
generating a securely randomized string, creating a second string by combining the securely randomized string with the first string, linking the second string to the preliminary ID, saving the second string and the preliminary ID in the database as related cells, creating an initial hash by hashing the second string, providing a preceding block hash creating a block hash by combining the preceding block hash and the initial hash, determining a block ID for the block hash, and adding the block ID and the block hash to the centralized ledger.

2. The method of claim 1, including the additional steps of:
creating a first code file with a first code file name and a first code file value, setting the first code file name as the block ID and the first code file value as the block hash, and saving the first code file to the first computer;
creating a second code file with a second code file name and a second code file value, setting the second code file name as the block ID and the second code file value as the block hash, and saving the second code file to the second computer;
creating a third code file with a third code file name and a third code file value, setting the third code file name as the block ID and the third code file value as the block hash, and saving the third code file to the third computer.

3. The method of claim 2, including the additional steps of, upon receiving a second visit from the first user, receiving the first code file name and the first code file value, locating the block ID in the centralized ledger using the first code file name, determining whether the first code file value matches the block hash, and if the first code file value and the block hash do not match, producing an error message.

4. The method of claim 2, including the additional steps of:
upon receiving a second visit from the first user, receiving the first code file name and the first code file value,
upon receiving a second visit from the second user, receiving the second code file name and the second code file value;
upon receiving a second visit from the third user, receiving the third code file name and the third code file value;
determining matching between the first code file value, the second code file value, the third code file value, and the block hash;
if the first code file value, the second code file value, and the third code file value match with each other but not the block hash, producing an error message.

5. The method of claim 4, with the first code file being a first cookie, the second code file being a second cookie, and third code file being a third cookie.

6. The method of claim 2, including the additional step of, upon receiving a request from the first user to see a validation check on the user interface platform, display the transactional or account information, the securely randomized string, the block hash, and the preceding block hash.

7. method of claim 2, including the additional step of not disclosing the transactional or account information to the second user or the third user or encrypting the transactional or account information or the block hash before disclosing to the second user or the third user.

8. The method of claim 2, including the additional step of not saving to any database accessible to an operator of the user interface platform information identifying which client browser or device has stored the block ID or the block hash.

9. The method of claim 1 with the code file being a cookie, the code file value being a cookie value, the code file name being the cookie name.

10. A method of preserving the integrity and privacy of user data including the steps of:
providing a user interface platform accessible over a network, receiving account or transaction information from users using the user interface platform, and saving the account and transactional information to a centralized ledger store on a server database;
receiving a visit from a user using a computer, receiving account or transactional information from the user, transforming the account or transactional information from the user into a first string, generating a securely randomized string, creating a second string by combining the securely randomized string with the first string, creating an initial hash by hashing the second string, providing a block hash, creating a block hash by combining the preceding block hash and the initial hash, setting a block ID for the block hash, adding the block ID, the block hash, and the securely randomized string to the centralized ledger;
selecting a target block, from the centralized ledger, containing target account or transactional information from the user;
receiving a first visit from a validating user using a validating user computer, creating a code file with a code file name and a code file value, setting the code file name as the block ID and the code file value as the block hash, and saving the code file to the validating user computer.

11. The method of claim 10, including the additional steps of:
upon receiving a second visit from the validating user, receiving the code file name and the code file value;
locating the block ID in the centralized ledger using the code file name and determining whether the code file value matches the block hash;
if the code file value and the block hash do not match, producing an error message.

12. The method of claim 11, the user and the validating user being distinct users and the code file value being encrypted.

13. The method of claim 11, the user and the validating user being the same user.

14. The method of claim 11, the code file value being encrypted and capable of being unencrypted by a salt or code accessible to the user.

15. The method of claim 10 with the code file being a cookie, the code file being a cookie value, and the code file name being the cookie name.

16. The method of claim 15, including the step of appending to the cookie name a string identifying whether the cookie value is encrypted.

17. The method of claim 11, including the step of displaying the error message to the validating user only if the validating user has permission to view the data.

18. The method of claim 11, including the step of storing the error message on the server in a form accessible only to users having permission to access the error message.

19. The method of claim 11 including the additional step of sending the error message to a set of one or more users other than the validating user.

20. The method of claim 10 where the target block is selected randomly.

21. The method of claim 10 where the target block is a previously unverified block or the least verified block.

22. The method of claim 10 where the target block is the most recent block.

23. A method of preserving the integrity and privacy of user data including the steps of:
receiving a visit from a user, receiving account or transactional information from the user, creating a block hash using the account or transactional information, setting a block ID for the block hash, adding the block ID and the block hash to a centralized ledger;
receiving a first visit from a validating user, creating a code file, saving the block ID and the block hash to the code file, and saving the code file to the computer;
upon receiving a second visit from the validating user, receiving the code file;
locating the block ID in the centralized ledger using the code file, determining whether the block hash from the code file matches the block hash in the centralized ledger;
if the block hash from the code file does not match the block hash from the centralized ledger, producing an error message.

* * * * *